(12) United States Patent
Nirenberg

(10) Patent No.: US 9,127,940 B2
(45) Date of Patent: Sep. 8, 2015

(54) DEPTH GUIDE SYSTEM FOR USE WITH WATERCRAFT TRAILERS, LIFTS, AND THE LIKE

(71) Applicant: David B. Nirenberg, Bonita Springs, FL (US)

(72) Inventor: David B. Nirenberg, Bonita Springs, FL (US)

(73) Assignee: Lake Red Rock LLC, Ankeny, IA (US)

( * ) Notice: Subject to any disclaimer, the term of this patent is extended or adjusted under 35 U.S.C. 154(b) by 247 days.

(21) Appl. No.: 13/800,145

(22) Filed: Mar. 13, 2013

(65) Prior Publication Data

US 2014/0091938 A1 Apr. 3, 2014

Related U.S. Application Data

(60) Provisional application No. 61/669,198, filed on Jul. 9, 2012.

(51) Int. Cl.
| | |
|---|---|
| *G08B 3/00* | (2006.01) |
| *G01C 5/00* | (2006.01) |
| *G08B 5/36* | (2006.01) |
| *B60P 3/10* | (2006.01) |

(52) U.S. Cl.
CPC .............. *G01C 5/00* (2013.01); *B60P 3/1033* (2013.01); *B60P 3/1075* (2013.01); *G08B 5/36* (2013.01)

(58) Field of Classification Search
None
See application file for complete search history.

(56) References Cited

U.S. PATENT DOCUMENTS

| | | | | |
|---|---|---|---|---|
| 2,592,929 | A | * | 4/1952 | Matchett .......................... 73/313 |
| 2,792,566 | A | * | 5/1957 | Shanhouse et al. ............ 340/620 |
| 3,307,399 | A | * | 3/1967 | Cashman ......................... 73/311 |
| 3,861,212 | A | * | 1/1975 | Henry ......................... 73/304 R |
| 3,995,251 | A | | 11/1976 | Jones |
| 4,099,167 | A | * | 7/1978 | Pomerantz et al. ............ 340/620 |
| 4,506,258 | A | * | 3/1985 | Charboneau et al. .......... 340/618 |
| 4,903,530 | A | * | 2/1990 | Hull ............................. 73/304 R |
| 5,146,785 | A | * | 9/1992 | Riley ............................... 73/313 |
| 5,150,615 | A | * | 9/1992 | Rymut et al. ..................... 73/313 |
| 5,229,751 | A | * | 7/1993 | Chandler et al. .............. 340/618 |
| 5,515,025 | A | | 5/1996 | Barrows |
| 5,596,944 | A | | 1/1997 | Massie |
| 5,719,556 | A | * | 2/1998 | Albin et al. .................... 340/618 |
| 5,727,421 | A | * | 3/1998 | Murphy ....................... 73/304 R |
| 5,850,175 | A | * | 12/1998 | Yeilding ....................... 340/431 |
| 6,065,420 | A | * | 5/2000 | Smith ............................ 114/343 |
| 6,199,503 | B1 | | 3/2001 | Midgett |
| 6,616,166 | B2 | | 9/2003 | Marchese |
| 6,973,828 | B2 | * | 12/2005 | Zimmermann et al. ......... 73/295 |
| 7,523,952 | B1 | | 4/2009 | Spears, Jr. |
| 7,547,159 | B1 | | 6/2009 | Warters |
| 7,692,557 | B2 | | 4/2010 | Medina et al. |

(Continued)

*Primary Examiner* — Julie Lieu
(74) *Attorney, Agent, or Firm* — Porter, Wright, Morris & Arthur, LLP

(57) ABSTRACT

A depth guide system gives an operator of a watercraft carrier an alert that the carrier is at a proper water depth to launch or stow the watercraft. The system includes an activator device or sensor having a housing vertically adjustable along a length of a vertical member. The device activates and deactivates the alert based on water level within the housing. When water is absent from the housing, the device activates a first LED at the top of the vertical member. When water located within the housing is sufficient to electrically connect two contacts, the device deactivates the first LED and activates a second LED of a different color at the top of the vertical member and can also activate an audible alert. A proximity sensor can be included which warns of any obstructions around the perimeter of the watercraft carrier via a secondary audible alarm.

15 Claims, 10 Drawing Sheets

(56) References Cited

U.S. PATENT DOCUMENTS

| | | |
|---|---|---|
| 7,876,234 B1 | 1/2011 | Spears, Jr. |
| 8,235,341 B2 * | 8/2012 | Taylor ...................... 248/292.14 |
| 2001/0035827 A1 * | 11/2001 | Snelling ........................ 340/622 |
| 2002/0100319 A1 * | 8/2002 | Yang ........................... 73/304 R |
| 2003/0137124 A1 | 7/2003 | Marchese |
| 2003/0233875 A1 * | 12/2003 | Stehman et al. ............. 73/304 C |
| 2004/0149032 A1 * | 8/2004 | Sell .............................. 73/304 C |
| 2004/0211351 A1 | 10/2004 | Emerson et al. |
| 2007/0080121 A1 * | 4/2007 | Pittman ........................... 211/35 |
| 2008/0117030 A1 * | 5/2008 | Medina et al. ............. 340/425.5 |
| 2013/0271284 A1 * | 10/2013 | Whitmire ...................... 340/618 |

* cited by examiner

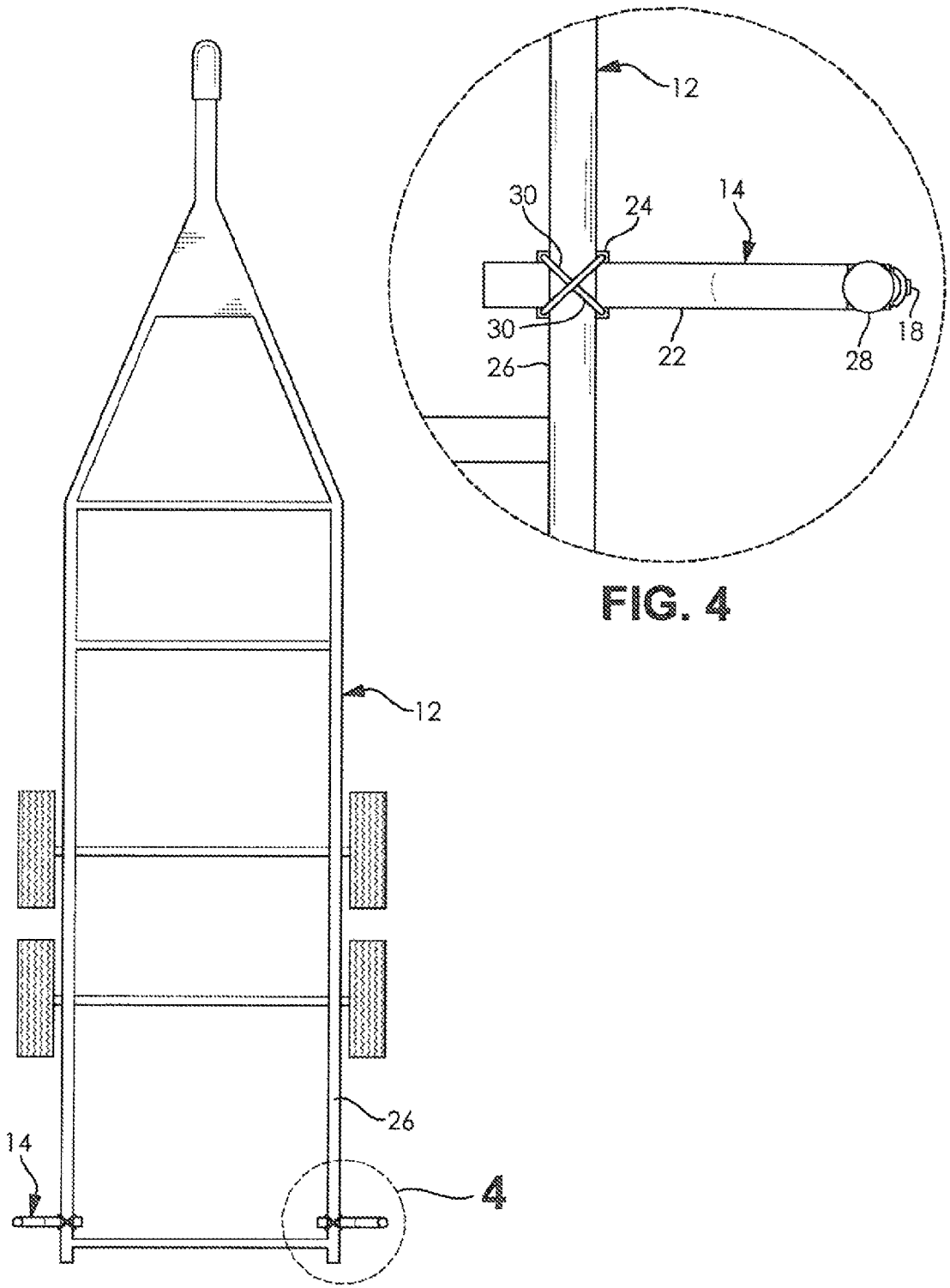

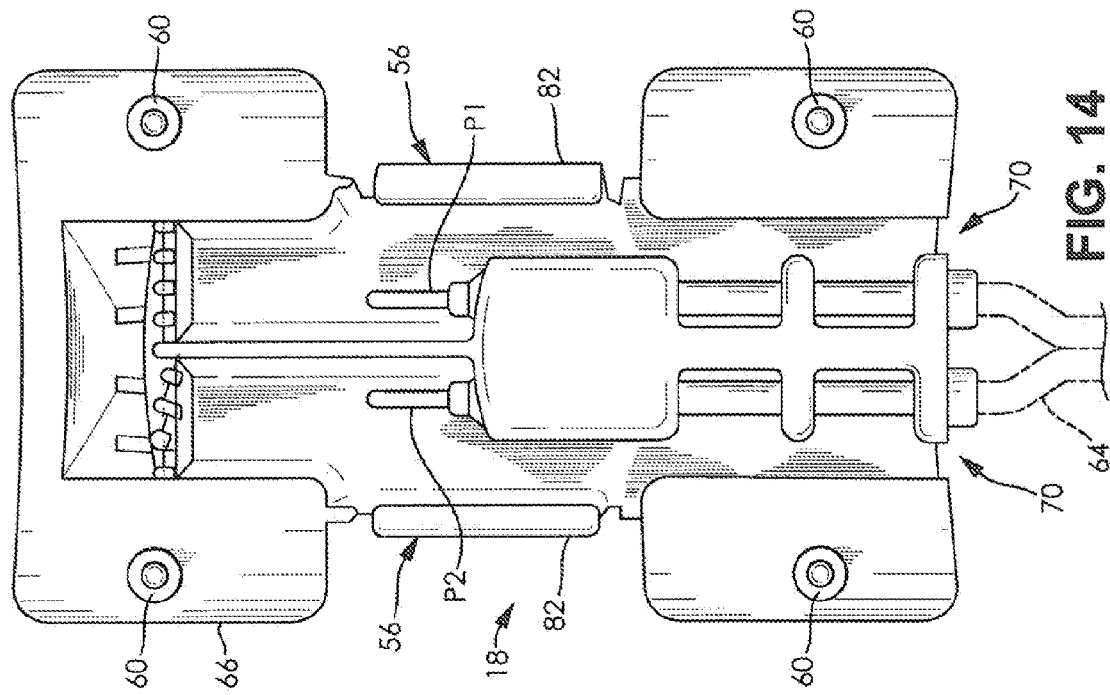
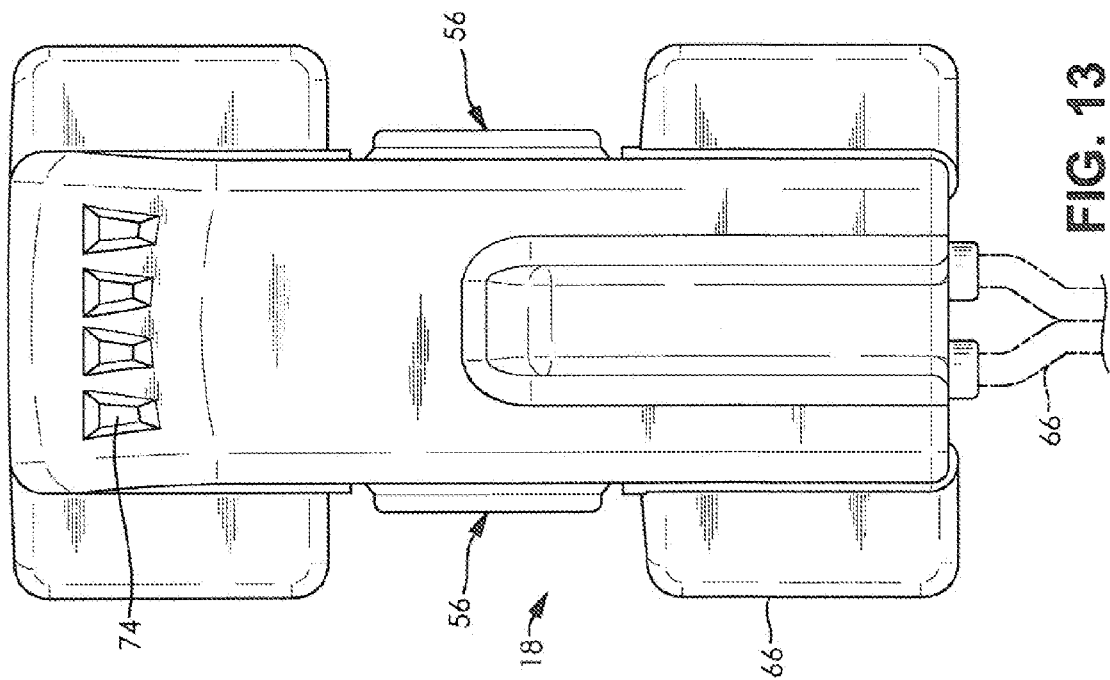

DEPTH GUIDE SYSTEM FOR USE WITH WATERCRAFT TRAILERS, LIFTS, AND THE LIKE

CROSS-REFERENCE TO RELATED APPLICATIONS

This application claims the priority benefit of U.S. Provisional Patent Application No. 61/669,198 filed on Jul. 9, 2012, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention relates to systems and methods for giving operators of watercraft carriers, such as watercraft trailers and watercraft lifts, alerts that the trailers or lifts are at a proper water depth to safely launch or recover watercraft from or to the trailers or lifts.

BACKGROUND OF THE INVENTION

If you have ever been to a boat ramp on a Saturday afternoon you have been witness to what can be a very stressful experience. The launching and recovery of a watercraft is sometimes a group effort, with one person driving a tow vehicle pulling the boat trailer, one person in the boat, and one person overseeing the entire operation from the dock or shore. But what if you are by yourself, the stress factor can rise to a whole new level with a very busy boat ramp and numerous other boaters anxiously waiting their turn to launch or recover their boat. Similar issues can exist when launching or recovering a watercraft from a boat lift.

Devices have been designed to automatically determine when watercraft trailers are at appropriate, predetermined depths. For example, see U.S. Pat. No. 7,876,234, the disclosure of which is expressly incorporated herein in its entirety by reference. However, these devices tend to be relatively complex in design and expensive and may not assure proper, consistent and safe boat launching practices. Such devices may have a tendency to become inoperable when the float valve becomes jammed due to debris or other reasons.

Accordingly, there is a need for a depth guide system and method that automatically determines when a watercraft trailer or lift is at an appropriate, predetermined depth within the water that assures proper, consistent and safe boat launching and recovering practices. Such a depth guide system and method should be easy to use, easy to install, inexpensive and relatively simple in design.

SUMMARY OF THE INVENTION

Disclosed herein are depth guide systems and methods which overcome at least one of the deficiencies of the prior art. Disclosed is a depth guide system for indicating a depth of a watercraft carrier within a body of water. The depth guide system comprise, in combination a vertically extending elongate member having a bottom and a top, and a visual indicator secured to the top of the elongate member, an activator device attached to the elongate member and having a housing with a hollow interior space and at least One opening so that water can pass into and out of the hollow interior space through the at least one opening and at least one probe located inside the hollow interior space of the housing and forming a pair of electrical contacts. The activator device is configured so that in a first state when the pair of electrical contacts are not electrically connected by water within the housing the activator device deactivates the visual indicator, and in a second state when water within the housing electrically connects the pair of contacts the activator device activates the visual indicator.

Also disclosed is a depth guide system comprising, in combination, a vertically extending elongate member having a bottom and a top, a visual indicator secured to the top of the elongate member, an activator device attached to the elongate member and having a housing with a hollow interior space and at least one opening so that water can pass into and out of the hollow interior space through the at least one opening and at least one probe located inside the hollow interior space of the housing and forming a pair of electrical contacts, and a mounting bracket secured to the elongate member at a fixed position and having a plurality of vertically-spaced apart mounting locations for the housing so that the housing is removably secured to any one of the mounting locations of the mounting bracket with a snap-lock connection in order to adjust the vertical position of the housing relative to the mounting bracket and the elongate member. The activator device is configured so that in a first state when the pair of electrical contacts are not electrically connected by water within the housing the activator device deactivates the visual indicator, and in a second state when water within the housing electrically connects the pair of contacts the activator device activates the visual indicator.

From the foregoing disclosure and the following more detailed description of various preferred embodiments it will be apparent to those skilled in the art that the present invention provides a significant advance in the technology and art of depth guide systems and methods. Particularly significant in this regard is the potential the invention affords for providing an easy to use, easy to install, inexpensive and relatively simple in design device. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 3 is a top plan view of the watercraft trailer of FIG. 1.

FIG. 4 is an enlarged fragmented view taken along line 4 of FIG. 3.

FIG. 13 is a front elevational view of the activator device of FIGS. 11 and 12.

FIG. 14 is rear elevational view of the activator device of FIGS. 11 to 13.

Figure 1:
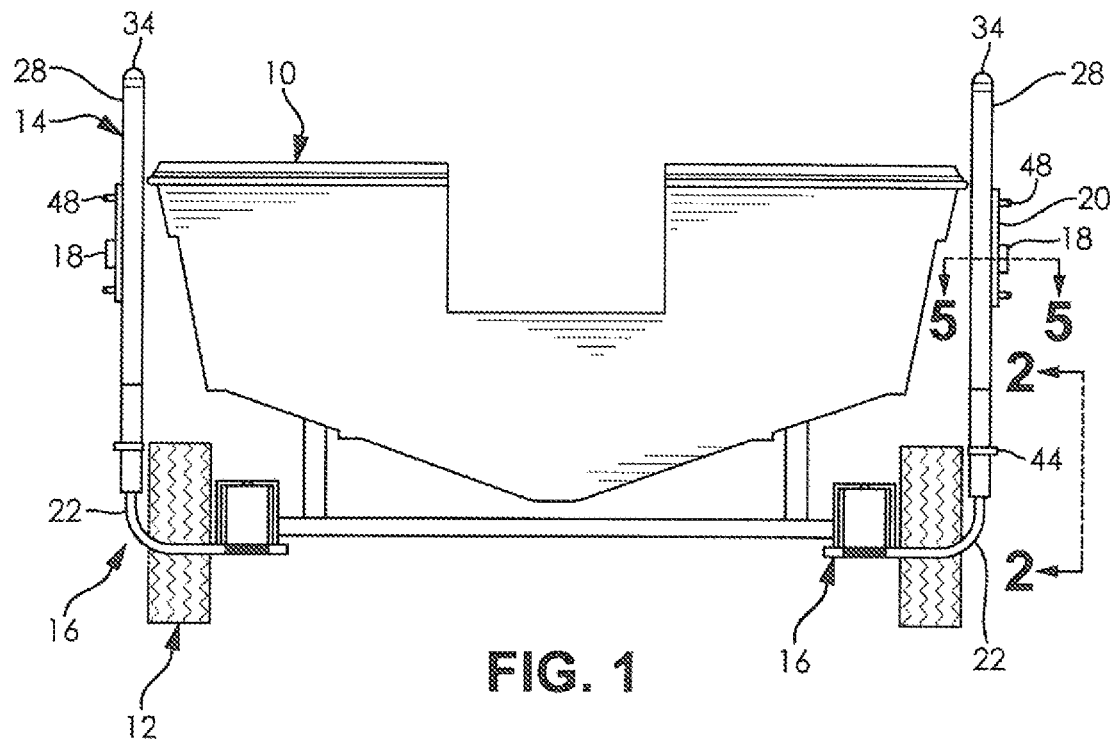
FIG. 1 is a rear elevational view of a watercraft trailer with a watercraft supported thereon and having a depth guide system according to the present invention.
Figure 2:
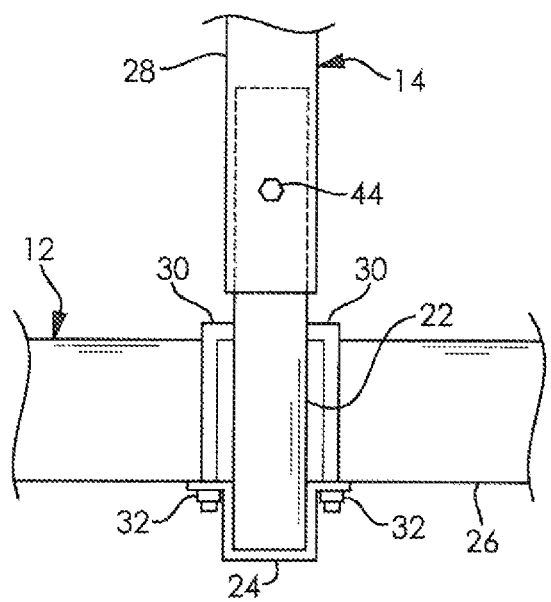
FIG. 2 is an enlarged, fragmented view taken along line 4-4 of FIG. 1.
Figure 5:
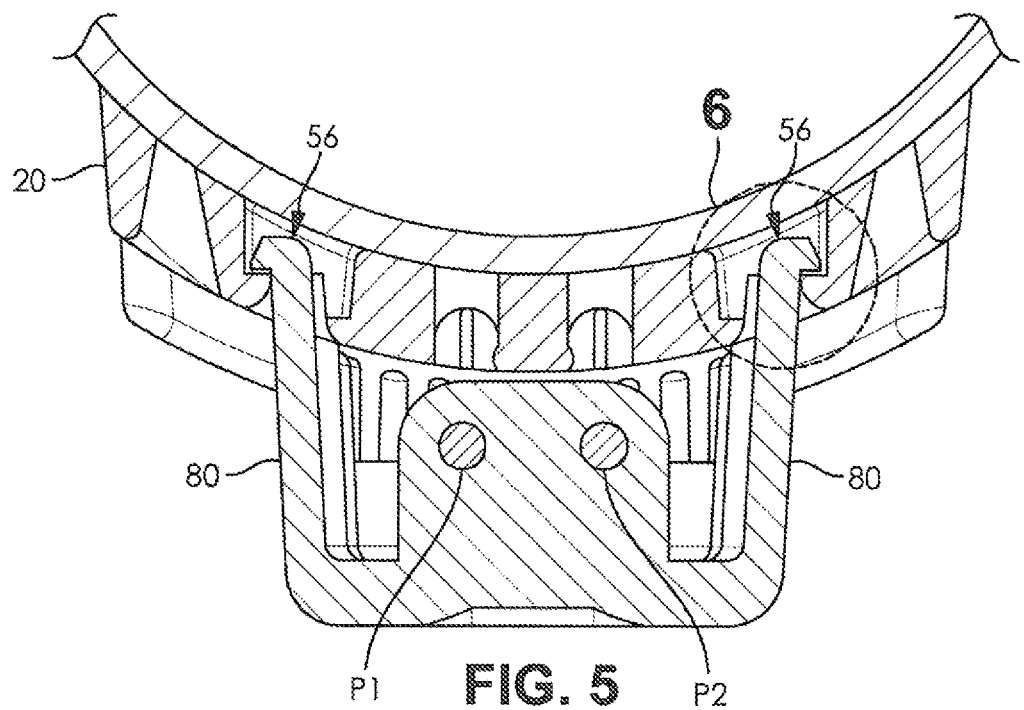
FIG. 5 is a cross-sectional view taken along line 5-5 of FIG. 1.
Figure 6:
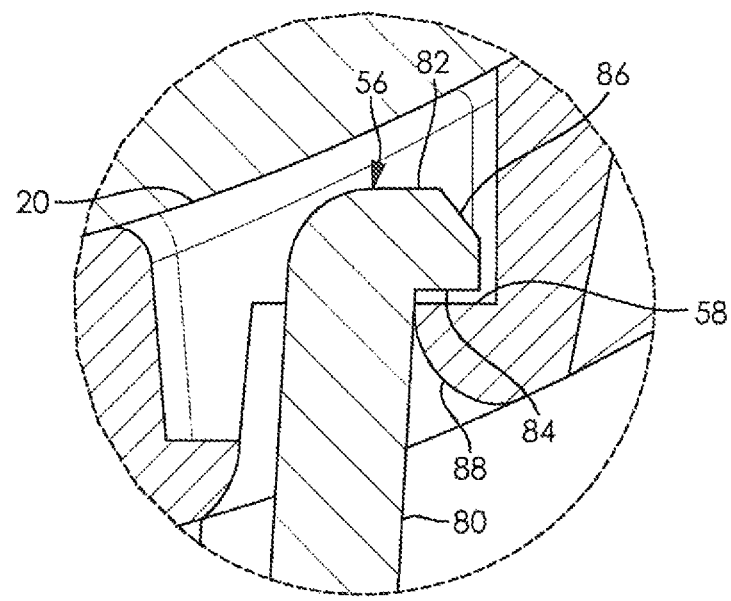
FIG. 6 is an enlarged fragmented view taken along line 6 of FIG. 5.

It should be understood that the appended drawings are not necessarily to scale, presenting a somewhat simplified representation of various preferred features illustrative of the basic principles of the invention. The specific design features of the depth guide system as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin, features may be thickened, for example, for clarity or illustration. All references to direction and position, unless otherwise indicated, refer to the orientation of the depth guide systems illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved depth guide systems and methods disclosed herein. The following detailed discussion of various alternative and preferred embodiments will illustrate the general principles of the invention with regard to watercraft carrier in the form of a boat trailer. Other embodiments suitable for other applications will be apparent to those skilled in the art given the benefit of this disclosure.

Referring now to the drawings, FIGS. 1 to 6 illustrate a boat 10 on a boat trailer 12 having a depth guide system 14 installed thereon according to the present invention. The illustrated depth guide system 14 includes a pair of upright assemblies 16, a pair of activator devices or sensors 18 secured to the upright assemblies 16, and a pair of mounting brackets 20 for adjustably securing the activator devices 18 to the upright assemblies 16. One of the upright assemblies 16 is for left or driver side of the boat trailer 12 and the other upright assembly 16 is for the right or passenger side of the boat trailer 12. The left-side upright assembly 16 is secured to the left or driver side of the boat trailer 12 at the rear of the boat trailer 12 and the right-side upright assembly 16 is secured to the right or passenger side of the boat trailer 12 at the rear of the boat trailer 12 opposite the left-side upright assembly 16 so that the boat 10 is launched and recovered between the upright assemblies 16. It is noted that alternatively only one or more than two of the upright assemblies 16 can be utilized and/or the upright assemblies 16 can be secured to the boat trailer 12 at any other suitable locations. The illustrated left and right side upright assemblies 16 are identical, therefore only the right-side upright assembly 16 will be described in more detail hereinafter.

The illustrated right-side upright assembly 16 includes an upright or L bracket 22, a support bracket 24 for securing the upright bracket 22 to a frame 26 of the boat trailer 12, and a vertical elongate member or guide pole 28 extending upward from the upright bracket 22. The illustrated upright bracket 22 is in the form of a square tube bent to form an "L" shape having horizontal portion and a vertical portion. It is noted that the upright bracket 22 can alternatively be formed in any other suitable manner. The horizontal portion is secured to the frame 26 of the boat trailer 12 in a horizontal and laterally extending manner at a rear of the boat trailer 12 with the horizontal portion below the frame 26 and the vertical portion extending vertically upward and laterally outward of the trailer frame 26. It is also noted that the upright bracket 22 can alternatively have any other suitable configuration.

The illustrated support bracket 24 is U-shaped having a bottom wall, a pair of side walls extending from opposed edges of the bottom wall, and pair of outwardly directed flanges extending from top edges of the side walls. The support bracket 24 is located below the trailer frame 26 with the horizontal portion of the upright bracket 22 extending therethrough between the side walls and the flanges engaging the bottom of the trailer frame 26. It is noted that the length of the support bracket 24 is longer than the width of the trailer frame 26 so that the flanges extend inwardly and outwardly beyond the trailer frame 26 in the lateral direction. A pair of U-bolts 30 extend over the trailer frame 26 flanges of the and through openings in the support bracket flanges 24. Threaded nuts 32 secure the U-bolts so that the upright bracket 22 is securely clamped between the trailer frame 26 and the support bracket 24 to prevent relative movement between the upright bracket 22 and the trailer frame 26. The illustrated U-bolts 30 are crossed in an X-shaped manner. It is noted that the lateral and horizontal positions of the vertical portion of the upright bracket 22 can be located as desired by adjusting the horizontal portion of the upright bracket 22 relative to the trailer frame 26 prior to securing it to the trailer frame 26. It is also noted that the support bracket 24 can alternatively have any other suitable configuration and the upright bracket 22 can alternatively be secured to the trailer frame 26 in any other suitable manner.

The illustrated the vertical elongate member or guide pole 28 is in the form of a hollow cylinder or tube and has a light housing 34 secured to and closing an upper end thereof. The vertical elongate member 28 can be a PVC pipe and can have a diameter of about 2 inches and a length of about 40 inches, about 48 inches, or about 60 inches depending on the size of the boat trailer 12 and the boat 10. It is noted that the light housing 34 should be located above the boat 10 when it is located on the boat trailer 12 so that the light housing 34 is visible to the driver of the tow vehicle of the boat trailer 12. It is also noted that the vertical elongate member 28 can alternatively have any other suitable configuration and can alternatively be formed of any other suitable material, shape, and/or dimensions.

The light housing 34 holds at least one visual indicator or alert 36 that produces a first visual indication and a second visual indicator or alert 38 different than the first visual indicator or alert 36. For example, the first visual indicator 36 can be a first color of light while the second visual indicator 38 can be a second color of light different than the first color of light. Also for example, the first visual indicator 36 can be a constant light while the second visual indicator 38 can be a flashing light. Preferably at least one audible indicator or alert 40 is also provided. The illustrated light housing 38 holds the first visual indicator or alert 36 in the form of a first LED D3 that produces a red light, the second visual indicator or alert 38 in the form of a second LED D4 that produces a green light, and the audible indicator or alert 40 in the form of an audible alarm (best shown in FIG. 7). It is noted that any other desirable colors of light or any other types of visual indicators or alerts can alternatively be utilized. Suitable electric wires extend from the LEDs D3, D4 and the audible alarm 40 in the light housing 34 and down through the elongate member 28 to connect the LEDs D3, D4 and the audible alarm 40 to the electrical, control circuit 42 as described in more detail herein below. It is noted that any other quantity of indicators or alerts can be utilized as long as there is at least one indicator or alert. The illustrated light housing 34 includes a cover in the form of a transparent dome so that the red and green LEDs D3, D4 can be seen therethrough when the LEDs D3 D4 are illuminated, but any other suitable protection can alternatively be provided.

As best seen in FIG. 1, the illustrated vertical elongate member 28 is secured to the upright bracket 22 by extending the bottom end of the vertical elongate member 28 over the vertical portion of the upright bracket 22 and securing the vertical elongate member 28 to the upright bracket 22 with at least one threaded fastener 44 to so prevent relative movement between the vertical elongate member 28 and the upright bracket 22. It is noted that the vertical elongate member 28 can alternatively be configured to extend into the vertical portion of the upright bracket 22 in a socket-like manner if desired.

Figure 8:
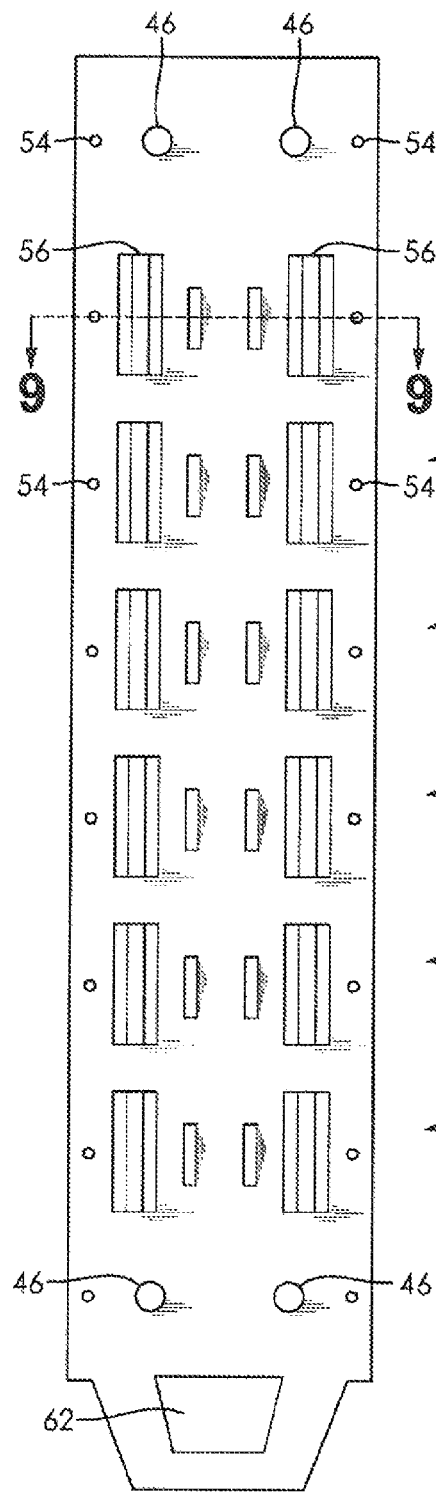
FIG. 8 is a front view of a mounting bracket for an activator device or sensor of the depth guide system of FIGS. 1 to 6.
Figure 9:
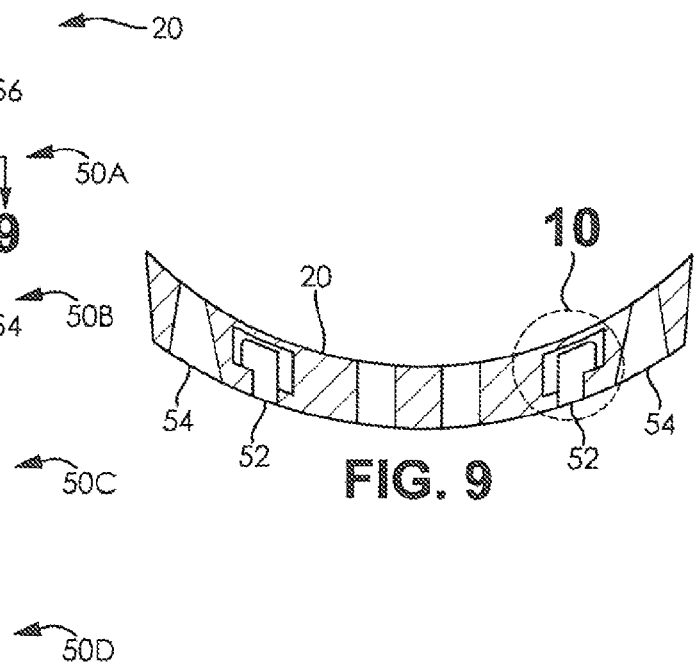
FIG. 9 is an enlarged cross-sectional view taken along line 9-9 of FIG. 8.
Figure 10:
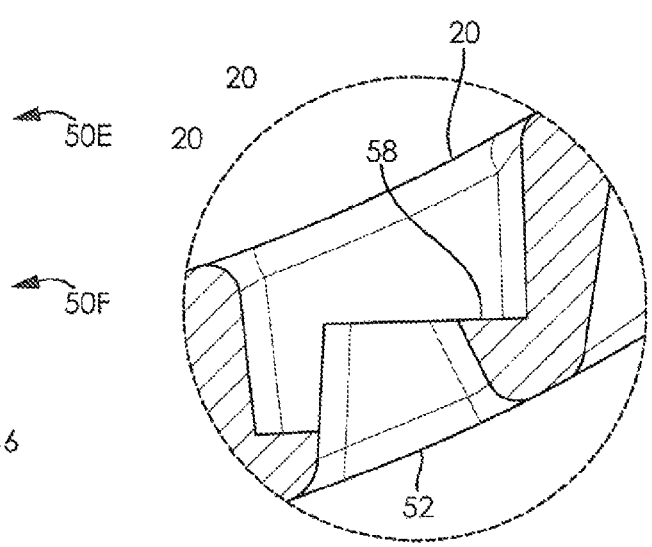
FIG. 10 is an enlarged fragmented view taken along line 10 of FIG. 9.
Figure 11:
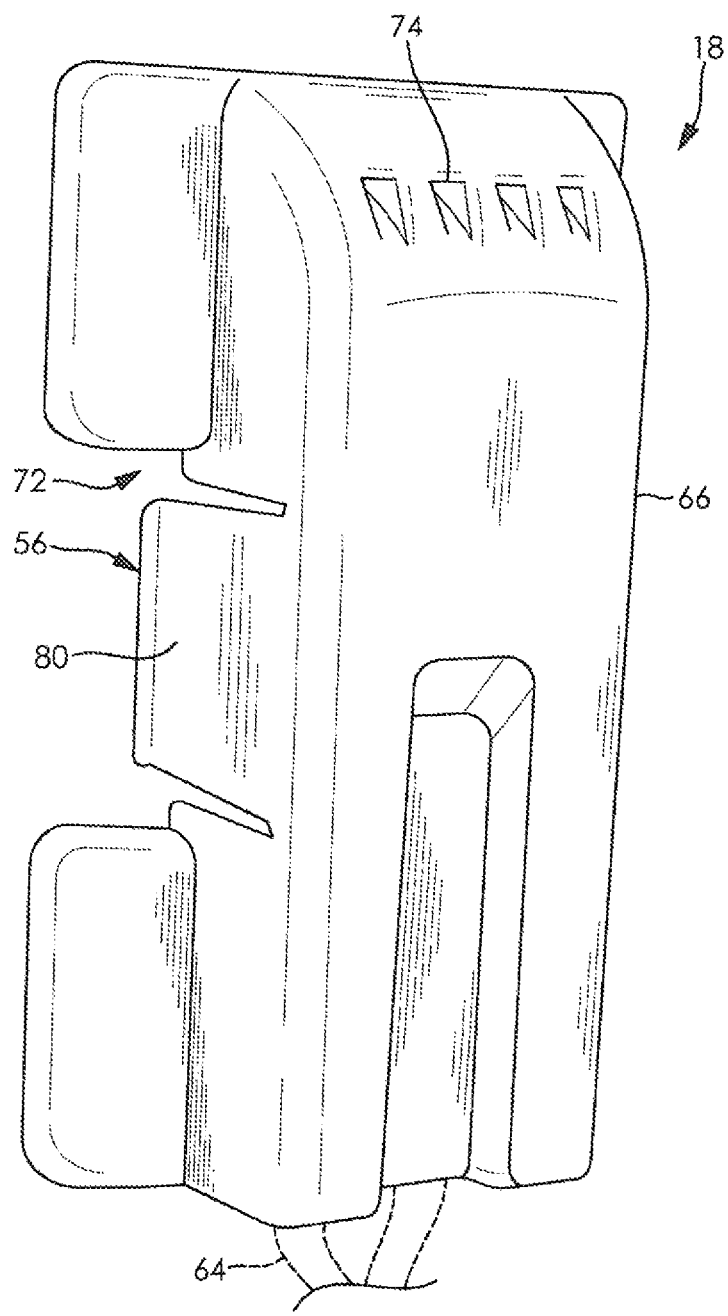
FIG. 11 is a front perspective view of the activator device of the depth guide system of FIGS. 1 to 6.
Figure 12:
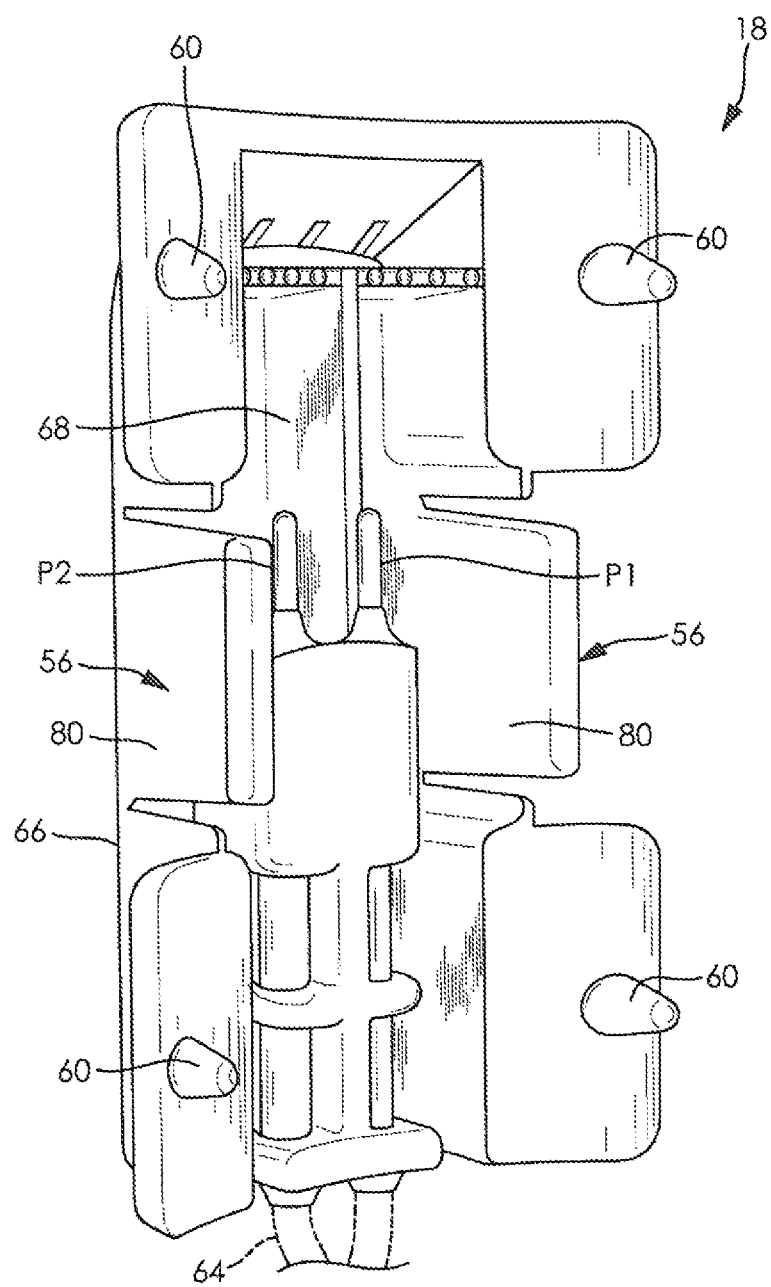
FIG. 12 is a rear perspective view of the activator device of FIG. 11.

As best shown in FIGS. 8 to 10, the illustrated mounting bracket 20 is generally elongate in the vertical direction and is concave to closely match the outer surface of the vertical elongate member 28. The illustrated mounting bracket 20 has mounting openings 46 located near its top and bottom for receiving threaded fasteners 48 to secure the mounting bracket 20 to exterior surface of the elongate member 28 on a lateral side of the elongate member 28 to prevent relative movement between the mounting bracket 20 and the elongate member 28, it is noted that the mounting bracket 20 can alternatively be secured to the elongate member 28 in any other suitable manner. The illustrated mounting bracket 20 has a plurality of vertically spaced-apart mounting locations 50A to 50F formed thereon so that the activator device 18 can be removably attached at any desired one of the mounting locations 50A to 50F in order to selectively position the activator device 18 at a desired height relative to the trailer frame 26 in a manner that can be easily adjusted. The illustrated mounting bracket 20 has six separate mounting locations 50A to 50F but any other suitable quantity can alternatively be utilized. Each of the illustrated mounting locations 50A to 50F includes pair of laterally spaced-apart attachment slots or openings 52 and a plurality of spaced-apart alignment or guide openings 54. The illustrated attachment openings 52 are configured for receiving snap-locks 56 of the activator device 18 to form a snap-lock connection therebetween (best seen in FIGS. 5 and 6). The illustrated attachment openings 52 have a rearward facing abutment 58 along a laterally outward edge that cooperates with the snap-locks 56 of the activator device 18 to secure the activator device to the mounting bracket 20 as described in more detail hereinafter. The illustrated guide openings 54 are configured for receiving alignment or guide posts 60 of the activator device 18 and located near laterally outward edges of the mounting bracket 20 and above and below the attachment openings 52. The illustrated guide openings 54 are conical shaped having a larger diameter at the forward side than at the rearward side to cooperate with the guide posts 60. The illustrated mounting bracket 20 has four guide openings 52 at each mounting location 50A to 50F but any other suitable quantity can alternatively be utilized to cooperate with the activator device 18. An access opening 62 is located near the bottom of the illustrated mounting bracket 20 for the passage of electrical wires 64 from the activator device 18, through the access opening 62 in the mounting bracket 20, and through an opening in the elongate member 28 to connect the activator device 18 to the electrical control circuit 42 as described in more detail herein below.

As best seen in FIGS. 11 to 17, the illustrated activator device 18 includes a housing 66 with a hollow interior space 68 and at least one opening 70, 72, 74 so that water can pass into and out of the hollow interior space 68 through the at least one opening 70, 72, 74 and at least one probe P1, P2 located inside the hollow interior space 68 of the housing 66 and forming a pair of electrical contacts 76, 78. The illustrated housing 66 is molded of plastic but it can alternatively be formed in any other suitable manner.

The illustrated activator housing 66 forms the pair of retaining tabs or snap locks 56 which rearwardly extend from lateral side walls of the activator housing 66. The snap-locks 56 are sized and shaped to cooperate with the attachment openings 52 of the mounting bracket 20 to removably secure the activator housing 66 to the mounting bracket 20 without the use threaded fasteners or tools. The illustrated snap-locks 56 have arms 80 that resiliently flex laterally inward about a forward end forming a vertical pivot axis and are provided with a hook 82 on a rearward end that has a forward facing abutment 84, The forward facing abutment 84 is configured to cooperate with the rearward facing abutment 58 of the mounting bracket attachment opening 52 to form an interlock in the forward rearward direction between the snap lock 56 and the mounting bracket 20 and secure the activator housing 66 to the mounting bracket 20 (best seen in FIGS. 5 and 6). The hooks 82 each have an angled camming surface 86 on a forward end so that the arms are automatically pivoted inward as they engage the forward side of the mounting bracket 20 as the snap-locks 56 are inserted into the attachment openings 52, The forward side of the mounting bracket 20 is also providing with a cooperating angled camming surface 88. Once the hooks 82 move behind the abutments 58, the arms 80 resilient snap back laterally outward so that the hooks 82 are located behind the mounting bracket abutments 58 and the interference created therebetween prevents the snap-locks 56 from being removed, from the mounting bracket attachment openings 52 so that the activator housing 66 is secured to the mounting bracket 22. To remove the activator housing 66 from the mounting bracket 20 the operator simply grasps the activator housing 66 so that they pinch each of the snap locks 56 laterally inward to remove the interference with the attachment openings 52 and pull outwardly to withdraw the snap-locks 56 from the attachment openings 52. The activator bracket 66 can then be snapped back into any of the mounting locations 50A to 50F of the mounting bracket 20 as desired. The position of the activator housing 66 is adjustable along the vertical length of the mounting bracket 20 to any one of the mounting locations 50A to 50F. Thus, the activator housing 66 can be easily moved between the various mounting locations 50A to 50F without the use of the use of threaded fasteners or tools because the illustrated activator housing 66 is selectively secured to the mounting bracket 20 with the snap-lock connections.

The illustrated activator housing 66 also forms the plurality of rearwardly extending alignment or guide posts or pins 60 that extend into the alignment or guide openings 54 of the mounting bracket 20 when the activator housing 66 is secured to the mounting bracket 20. The illustrated activator housing 66 has four guide pins 60 but any other suitable quantity can alternatively be utilized. The illustrated guide pins 60 are conical shaped having a larger diameter at the forward end than at the rearward or free end to cooperate with the guide openings 54. The guide pins 60 act as alignment pins to assure that the retaining tabs or snap-locks 56 align with the attachment openings 52 to securely lock the housing 66 to the mounting bracket 20. The guide pins 60 also add strength to the connection between the housing 66 and the mounting bracket 20 and create an anti-pivot factor to the connection.

The illustrated activator device 18 changes between a first state wherein the activator device 18 activates the first visual indicator 36 and not the second visual indicator 38 or the audible indicator 40 and a second state wherein the activator device 18 activates the second visual indicator 38 and the audible indicator 40 but not the first visual indicator 36. The illustrated activator device 18 includes two metal probes P1, P2 mounted within the hollow interior space 68 of the housing 66 and each forms one of the electrical contacts 76, 78. When the electrical contacts 76, 78 of the probes P1, P2 are not electrically connected by water, the activator device 18 is in the first state. When water enters the housing and contacts both of the electrical contacts 76, 78 of the probes P1, P2 simultaneously so that they are electrically connected by the water within the housing 66, the activator device 18 is in the second state. It is noted that when the probes P1, P2 are not electrically connected, the first visual indicator 36 is connected to a ground side of the electrical control circuit 42 to activate the first visual indicator 36 and when the probes P1, P2 are electrically connected by the water, the second visual indicator 38 and the audible indicator 40 are connected to the ground side of the electrical control circuit 42 to activate the second visual indicator 38 and the audible indicator 40. In this manner, the activator device 18 activates the appropriate alerts with no moving parts and without switching of the positive side of the circuit, eliminating the problem of arcing when a switch becomes active and shorting to ground which prevents switching back to stage one.

Figure 7:
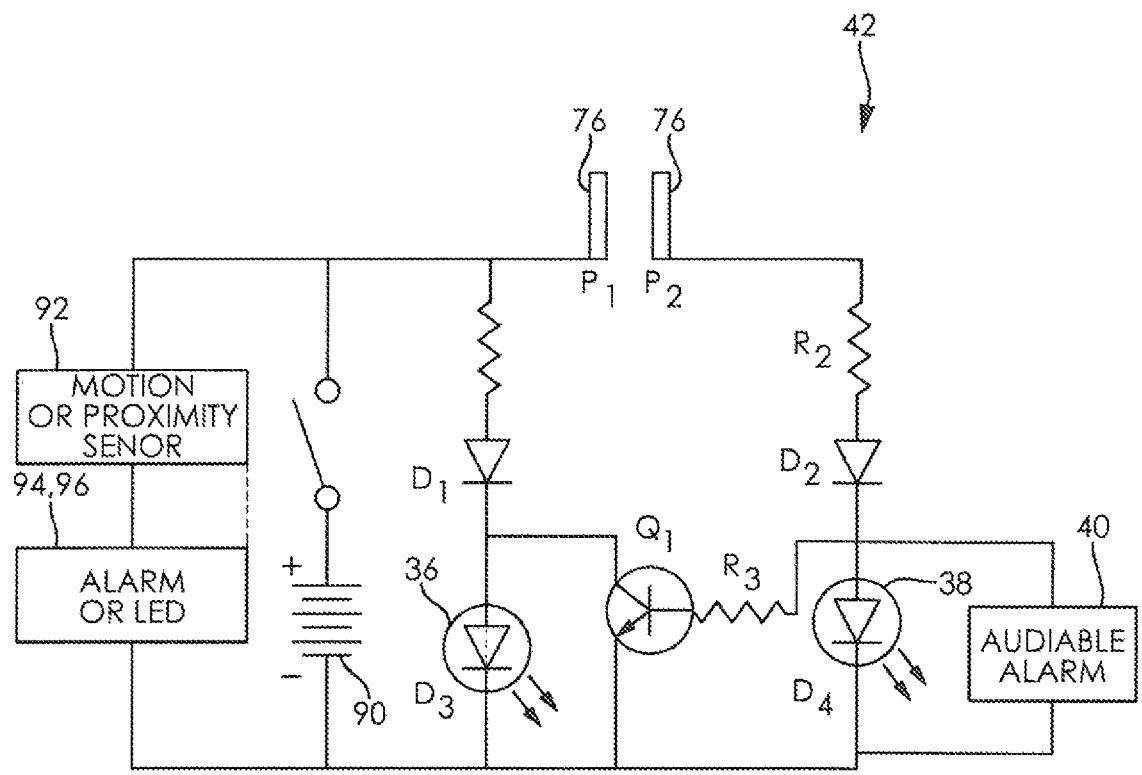
FIG. 7 is an electrical schematic of the depth guide system of FIGS. 1 to 6.

As best shown in FIG. 7, the illustrated electrical circuit 42 connects the green LED D4 and the red LED D3 in parallel relative to a battery 90 and connected by a bipolar NPN transistor Q1. Ordinarily, the probes P1, P2 are open (not electrically connected) so no current flows through the Green LED D4 or the bipolar NPN transistor Q1, but current flows through the red LED D3 to create red light. When the probes P1, P2 are electrically connected by water, current flows through the green LED D4 to create green light and also to the bipolar NPN transistor Q1 which saturates to permit current to flow therethrough to short the red LED D3. When the Red LED D3 is shorted, it is not energized and does not produce red light. The illustrated audible alarm 40 is located with the green LED D4 so that it is energized only when the green LED D4 is energized. It is noted that any other suitable electrical circuit 42 can alternatively be utilized.

Figure 16:
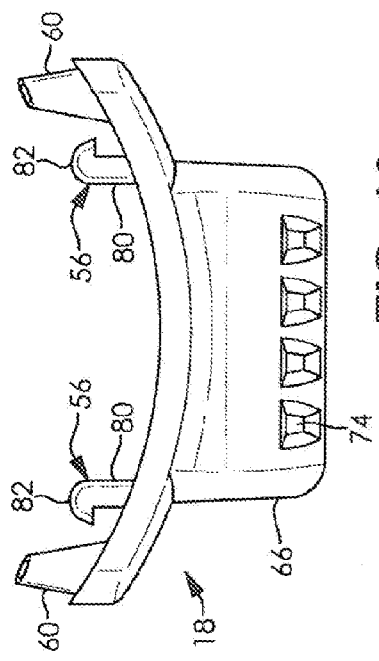
FIG. 16 is top plan view of the activator device of FIGS. 11 to 15.
Figure 15:
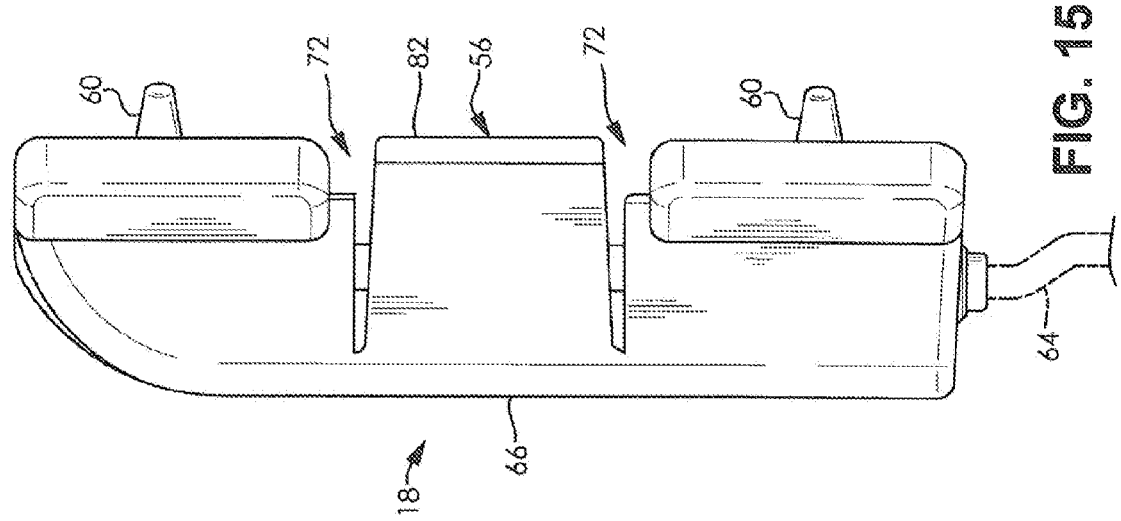
FIG. 15 is a right side elevational view of the activator device of FIGS. 11 and 14.
Figure 18:
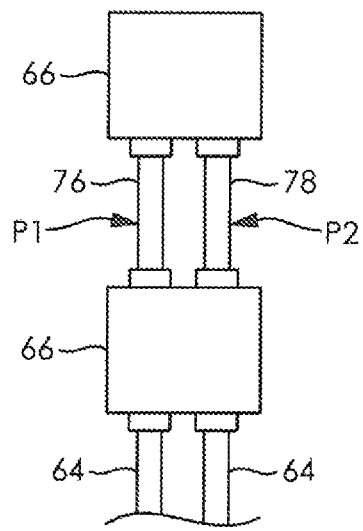
FIG. 18 is schematic view of a first variation of the water sensing probes of the activator assembly of FIGS. 11 to 17.
Figure 19:
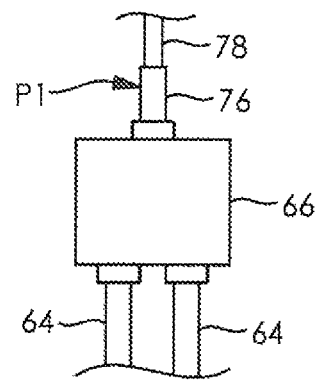
FIG. 19 is schematic view of a second variation of the water sensing probes of the activator assembly of FIGS. 11 to 17.
Figure 20:
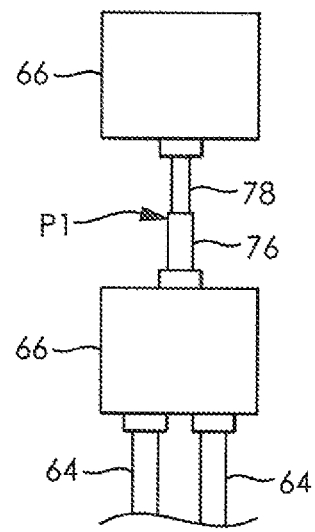
FIG. 20 is schematic view of a third variation of the water sensing probes of the activator assembly of FIGS. 11 to 18.

The illustrated probes P1, P2 are vertically oriented, parallel and laterally spaced apart. The illustrated probes P1, P2 are separated by a gap of about ¼ inch but any other suitable gap can be utilized. The illustrated probes P1, P2 are encapsulated by the housing plastic at their lower ends so that they extend upwardly in a cantilevered manner. The electrical wires 64 extend from the lower ends of the probes P1, P2 and out of the activator housing 66 to connect the probes P1, P2 to the electrical control circuit 42. It is noted that the probes P1, P2 can alternatively be mounted in any other suitable manner. FIG. 14 illustrates a first variation of the probes P1, P2 in which both ends of the probes P1, P2 are encapsulated in the housing plastic so that only central portions of the probes P1, P2 are exposed to contact water within the housing 66. FIG. 15 illustrates a second variation of the probes P1, P2 wherein the pair of probes P1, P2 is replaced with a single probe P1 forming both of the at least two separate electric contacts 76, 78. FIG. 16 illustrates a third variation of the probes P1, P2 wherein the single probe P1 forming the at least two separate electric contacts 76, 78 is encapsulated at both ends such that the two separate contacts 76, 78 are exposed between the encapsulated ends.

Figure 17:
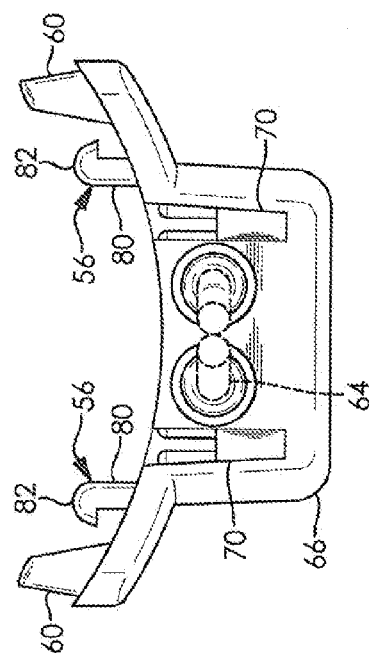
FIG. 17 is bottom plan view of the activator device of FIGS. 11 to 16.

The activator housing 66 must have at least one opening 70, 72, 74 that allows water to enter the hollow interior space 68 of the housing 66 and exit the hollow interior space 68 of the housing 66. The illustrated activator housing 66 has openings 70, 72, 74 at three different heights so that the water will quickly contact both of the probes P1, P2 simultaneously when the boat trailer 12 is at the appropriate depth in the water. As best shown in FIG. 17, a plurality of first openings 70 is located on the bottom wall of the housing 66 and spaced below the probes P1, P2. The first openings 70 permit water to enter the housing 66 as the housing engages the water as the boat trailer 12 is backed into the water. The first openings 70 also permit the water within the housing 66 to drain out of the housing when the boat trailer 12 is pulled out of the water. As best shown in FIG. 15, a plurality of second openings 72 is located on lateral side walls of the housing 66 near the probes P1, P2. The second openings 72 permit water to enter the housing 66 at a faster rate by providing additional openings if the housing enters the water at a faster rate than the first openings 70 can maintain the water level within the housing 66 substantially equal to the water level surrounding the housing 66. As best shown in FIG. 13, a plurality of third openings 74 is located on a front wall of the housing 66 spaced above the probes P1, P2. The third openings 74 permit water to enter the housing 66 at an even faster rate by providing additional openings if the housing 66 enters the water at an even faster rate than the first and second openings 70, 72 can maintain the water level within the housing 66 substantially equal to the water level surrounding the housing 66. It is noted that without the additional levels of openings 72, 74, the activation of the alerts could be delayed when the boat trailer 12 enters the water due to that fact that the water does not enter the housing 66 fast enough to maintain the water level within the housing 66 equal to the level surrounding the housing 66. Thus, the alerts will be activated too late (that is, at a water depth deeper than intended). It is noted that any other suitable, quantity and/or location of openings 70, 72, 74 can alternatively be utilized. The illustrated housing 66 with multiple level openings 70, 72, 74 enables the probes P1, P2 to be protected from debris, damage, and inadvertent connection while still enabling the probes P1, P2 to be timely connected by the water at the desired level regardless of the speed of entering the water.

During normal operation of the boat trailer 12 outside of the water, water does not connect the probes P1, P2 and thus the activator device 18 is in the first state so that the red LED D3 is activated or energized. The red LED D3 thus operates as a running light for the boat trailer 12 when out of the water. When it is desired to place the boat trailer 12 at a desired depth in the water appropriate for launching or receiving the boat 10, the boat trailer 12 is slowly backed into the water with the red LED D3 activated. When the activator housing 66 begins to go below the water, water enters the housing 66. When the water electrically connects the probes P1, P2, the activator device 18 goes into its second state wherein the red LED D3 is deactivated or de-energized and the green LED D4 is activated or energized and the audible alarm 40 is activated or energized. Upon seeing the green LED D4 and/or hearing the audible alarm 40, the driver stops the boat trailer 12 at its current position and depth within the water and launches or recovers the boat 10. If the depth of the boat trailer 12 is not as desired, the activator device 18 is raised or lowered along the length of the mounting bracket 20 as needed and the process is repeated. When the boat trailer 12 is removed from the water, the water within the activator housing 66 drains out of the housing through the first openings 70 and when the electrical connection between the probes P1, P2 is broken, the activator device 18 automatically goes back to the first state wherein the red LED D3 is activated or energized, the green LED D4 is deactivated or de-energized, and the audible alarm 40 is deactivated or de-energized. The red LED D3 can then again operate as a running light for the boat trailer 12.

The above described depth guide system 14 can be modified by including a proximity switch or sensor 92 within the elongate member 28 or any other suitable location. When the boat trailer 12 is being backed into the water and the proximity switch 92 indicates that an obstruction is with a predetermined distance of the proximity switch 92, the activator device 18 activates a third state wherein a third visual indicator 94 is activated and/or a second audible alarm 96 is activated. The third visual indicator 94 can be an LED having a third color different than the first two visual indicators 36, 38, can flash either the first or second LEDs 36, 38, or can be any other desirable visual indication. The second audible alarm 96 preferably has a sound different than the first audible alarm 40. The proximity switch 92 gives an indication that the boat trailer 12 is free from obstructions, such as a dock, seawall, other trailer or vehicle, other watercraft, a person, or the like, about the perimeter of the proximity switch 92 so that the boat 10 can be safely launched therefrom.

The above described depth guide system 14 can be sold as a full kit for installations on trailers 12 not having guide poles 28 so that the upright brackets 22 and associated mounting hardware is included. For example the full kit can include: driver side light assembly with 16' marine tinned wiring; passenger side light assembly with 9' marine tinned wiring; mounting plate for activator device; four self-tapping screws for mounting plate; activator device with white coiled wire; 3' marine tinned wiring; two mounting screws; six blue piggy back wire connectors; two 6" pole secure bolts and nuts; one self-tapping screw for secure ground; six galvanized wire clips; four 12" wire zip ties; two 19.75"×17.125" galvanized pole supports; two sets of 3"×4" U-bolts with mounting plates and hardware; and two 48" PVC light support poles. The above described depth guide system 14 can also be sold as a partial kit for installation on trailers 12 already having guide poles 28 so that the upright brackets 22 and associated mounting hardware is not required. For example the partial kit can include: driver side light assembly with 16' marine tinned wiring; passenger side light assembly with 9' marine tinned wiring; mounting plate for activator device; four self-tapping screws for mounting plate; activator device with white coiled wire; 3' marine tinned wiring; two mounting screws; six blue piggy back wire connectors; two 6" pole secure bolts and nuts; one self-tapping screw for secure ground; six galvanized wire clips; four 12" wire zip ties; and two 48" PVC light support poles.

Figure 21:
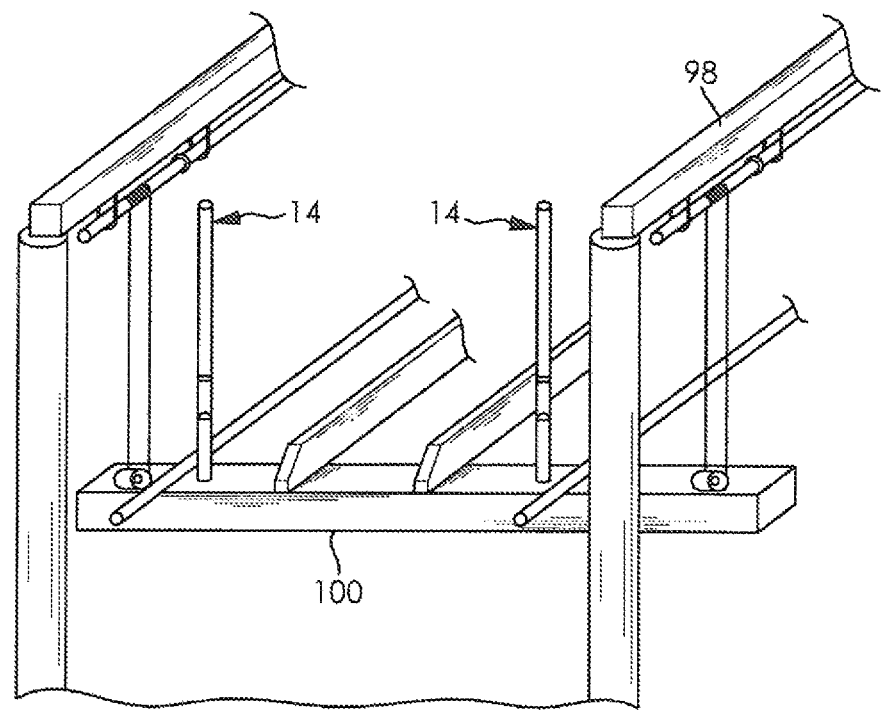
FIG. 21 is a fragmented perspective view of a watercraft lift having a depth guide system according to the present invention.

FIG. 21 illustrates a watercraft lift 98 having a depth guide system 10 attached thereto according to the present invention. The illustrated depth guide system 10 for the watercraft lift 98 is substantially the same as described above for the watercraft trailer 12 except that the guide poles 28 may be secured to the lift beam 100 in any other suitable manner.

It is noted that each of the features and variations of the above disclosed embodiments can be used in any combination which each of the other embodiments.

From the foregoing disclosure it is apparent that the depth guide system of the present invention addresses the previously mentioned needs in the art by providing a system and method that quickly, consistently, accurately and safely determines when a watercraft carrier is at the proper depth within the water in order to allow a watercraft to be launched into or recovered from the water safely and is clear of surrounding obstacles. Additionally, the depth guide system of the present invention is of simple design and construction so that it is relatively inexpensive to manufacture and is affordable to a large segment of watercraft trailer owners. Furthermore, the depth guide system of the present invention is simple to install and no extensive modifications to the trailer or tow vehicle are needed.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A depth guide system for indicating a depth of a watercraft carrier within a body of water, the depth guide system comprising, in combination:

a vertically extending elongate member having a bottom and a top, wherein the elongate member is a hollow cylinder;

a visual indicator secured to the top of the elongate member;

an activator device attached to the elongate member and having a housing with a hollow interior space and at least one opening so that water can pass into and out of the hollow interior space through the at least one opening and at least one probe located inside the hollow interior space of the housing and forming a pair of electrical contacts, wherein the activator device is configured so that in a first state when the pair of electrical contacts are not electrically connected by water within the housing the activator device deactivates the visual indicator, and in a second state when water within the housing electrically connects the pair of contacts the activator device activates the visual indicator;

a mounting bracket secured to an outer surface of the elongate member and having a plurality of vertically-spaced apart mounting locations for the housing, the mounting bracket is concave to match the outer surface of the elongate member, and wherein the housing is removably secured to any one of the mounting locations of the mounting bracket with a snap-lock connection, wherein the snap lock connection includes resiliently flexible arms on the housing that are configured to cooperate with attachment openings in the mounting bracket to selectively secure the housing to the mounting bracket at a desired mounting location; and the housing is provided with a plurality of guide posts that are configured to extend into guide openings of the mounting brackets and align the arms with the attachment openings.

2. The depth guide system according to claim 1, wherein the at least one probe is two spaced apart metal probes each of which forms a separate one of the pair of electrical contacts.

3. The depth guide system according to claim 1, wherein a single probe forms both of the pair of electrical contacts.

4. The depth guide system according to claim 1, wherein the housing is removably secured to the elongate member with a snap-lock connection and is adjustable between a plurality of mounting locations along a vertical length of the elongate member.

5. The depth guide system according to claim 1, wherein the at least one opening in the housing for the passage of water includes at least one first opening located below the pair of electrical contacts, at least one second opening located near a vertical level of the pair of electrical contacts, and at least one third opening located above the pair of electrical contacts.

6. The depth guide system according to claim 5, wherein the at least one first opening is located near a bottom of the housing and the at least one third opening is located near a top of the housing.

7. The depth guide system according to claim 1, further comprising a proximity sensor for identifying an obstruction and an audible alarm that is activated by the proximity sensor.

8. A depth guide system for indicating a depth of a watercraft carrier within a body of water, the depth guide system comprising, in combination: a vertically extending elongate member having a bottom and a top; wherein the elongate member is a hollow cylinder; a visual indicator secured to the top of the elongate member; an activator device attached to the elongate member and having a housing with a hollow interior space and at least one opening so that water can pass into and out of the hollow interior space through the at least one opening and at least one probe located inside the hollow interior space of the housing and forming a pair of electrical contacts; wherein the activator device is configured so that in a first state when the pair of electrical contacts are not electrically connected by water within the housing the activator device deactivates the visual indicator, and in a second state when water within the housing electrically connects the pair of contacts the activator device activates the visual indicator; and a mounting bracket secured to an outer surface of the elongate member at a fixed position and having a plurality of vertically-spaced apart mounting locations for the housing so that the housing is removably secured to any one of the mounting locations of the mounting bracket with a snap-lock connection in order to adjust the vertical position of the housing relative to the mounting bracket and the elongate member; and wherein the mounting bracket is concave to match the outer surface of the elongate member; wherein the at least one probe is two spaced apart metal probes each of which forms a separate one of the pair of electrical contacts;

wherein the snap lock connection includes resiliently flexible arms on the housing that are configured to cooperate with attachment openings in the mounting bracket to selectively secure the housing to the mounting bracket at a desired mounting location; and wherein the housing is provided with a plurality of guide posts that are configured to extend into guide openings of the mounting brackets and align the arms with the attachment openings.

9. The depth guide system according to claim 8, wherein the at least one probe is two spaced apart metal probes each of which forms a separate one of the pair of electrical contacts.

10. The depth guide system according to claim 8, wherein the housing is provided with a plurality of guide posts that are configured to extend into guide openings of the mounting brackets and align the arms with the attachment openings.

11. The depth guide system according to claim 10, wherein the guide posts are conical shaped.

12. The depth guide system according to claim 8, wherein the housing is provided with two of the arms and the arms resiliently flex toward one another to release the housing from the mounting bracket.

13. The depth guide system according to claim 8, wherein the at least one opening in the housing for the passage of water includes at least one first opening located below the pair of electrical contacts, at least one second opening located near a vertical level of the pair of electrical contacts, and at least one third opening located above the pair of electrical contacts.

14. The depth guide system according to claim 13, wherein the at least one first opening is located near a bottom of the housing and the at least one third opening is located near a top of the housing.

15. The depth guide system according to claim 8, further comprising a proximity sensor for identifying an obstruction and an audible alarm that is activated by the proximity sensor.

\* \* \* \* \*